United States Patent
Chen et al.

(10) Patent No.: US 12,443,487 B2
(45) Date of Patent: Oct. 14, 2025

(54) QUICK START METHOD

(71) Applicant: HUAWEI TECHNOLOGIES CO., LTD., Guangdong (CN)

(72) Inventors: Jianguo Chen, Shenzhen (CN); Lei Dai, Shenzhen (CN); Yangyang Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 18/339,925

(22) Filed: Jun. 22, 2023

(65) Prior Publication Data

US 2023/0333935 A1 Oct. 19, 2023

Related U.S. Application Data

(63) Continuation of application No. PCT/CN2021/140270, filed on Dec. 22, 2021.

(30) Foreign Application Priority Data

Dec. 23, 2020 (CN) .......................... 202011541530.9

(51) Int. Cl.
  *G06F 11/00* (2006.01)
  *G06F 11/07* (2006.01)
  *G06F 11/14* (2006.01)

(52) U.S. Cl.
  CPC ...... *G06F 11/1438* (2013.01); *G06F 11/0793* (2013.01); *G06F 11/1417* (2013.01); *G06F 2201/865* (2013.01)

(58) Field of Classification Search
  CPC ............ G06F 11/0793; G06F 11/1417; G06F 11/1438; G06F 2201/865
  See application file for complete search history.

(56) References Cited

U.S. PATENT DOCUMENTS

6,230,286 B1 * 5/2001 Shapiro ............... G06F 11/0784
  714/23
6,948,099 B1 * 9/2005 Tallam ................ G06F 11/1417
  714/38.14

(Continued)

FOREIGN PATENT DOCUMENTS

CN  103678040 A  3/2014
CN  104461645 A  3/2015

*Primary Examiner* — Joshua P Lottich
(74) *Attorney, Agent, or Firm* — WOMBLE BOND DICKINSON (US) LLP

(57) ABSTRACT

This application provides a quick start method. When a software fault occurs in a device, a restart request is called through a customized interface that complies with an instruction set specification, to indicate firmware to restart system software; and an image of the system software such as an operating system, a hypervisor, or a Trusted Execution Environment (TEE) is loaded to restart the system software, without resetting hardware. This skips a hardware initialization process, and shortens time required for restarting the device. When a hardware fault occurs in the device, a suspend request is triggered to indicate to freeze a process of system software, and indicate firmware to store a snapshot of status information of a hardware device and perform a hardware reset operation. After the hardware is reset, the hardware device is restored to a status before reset based on the snapshot.

16 Claims, 10 Drawing Sheets

(56) References Cited

U.S. PATENT DOCUMENTS

| | | | | |
|---|---|---|---|---|
| 7,652,982 | B1* | 1/2010 | Kovummal | H04L 49/552 370/216 |
| 8,806,266 | B1* | 8/2014 | Qu | G06F 11/1438 714/4.11 |
| 10,379,922 | B1* | 8/2019 | Bell | G06F 11/0712 |
| 2003/0217310 | A1 | 11/2003 | Ebsen et al. | |
| 2009/0228696 | A1* | 9/2009 | McKelvey | H04L 69/40 713/2 |
| 2013/0332771 | A1* | 12/2013 | Salapura | G06F 11/1484 714/15 |
| 2014/0089725 | A1* | 3/2014 | Ackaret | G11B 20/1883 711/171 |
| 2014/0310509 | A1* | 10/2014 | Potlapally | G06F 11/1417 713/2 |
| 2014/0310510 | A1* | 10/2014 | Potlapally | G06F 9/4406 714/19 |
| 2015/0220411 | A1* | 8/2015 | Shivanna | G06F 11/1417 714/33 |
| 2016/0026545 | A1* | 1/2016 | Johnson | G06F 11/0706 711/161 |
| 2018/0322012 | A1* | 11/2018 | Sharma | G06F 21/572 |
| 2019/0243637 | A1* | 8/2019 | Nachimuthu | G06F 8/656 |
| 2020/0293405 | A1* | 9/2020 | Liu | G06F 11/1438 |
| 2020/0326956 | A1* | 10/2020 | Raayman | G06F 9/4408 |
| 2021/0117272 | A1* | 4/2021 | Kleppinger | G06F 11/1461 |
| 2021/0157921 | A1* | 5/2021 | Brown | G06F 21/575 |
| 2021/0209003 | A1* | 7/2021 | Kowkutla | G06F 11/1417 |
| 2022/0113982 | A1* | 4/2022 | Huang | G06F 1/3203 |

\* cited by examiner

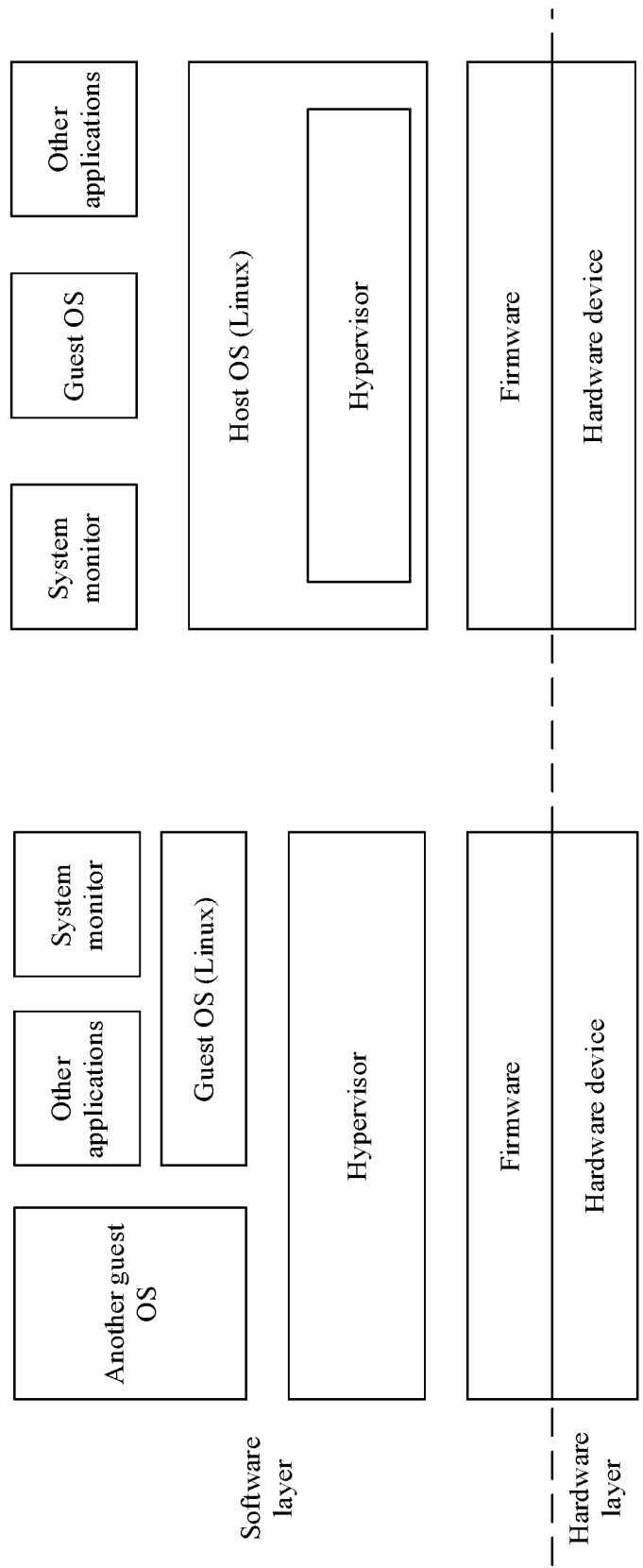

QUICK START METHOD

CROSS-REFERENCE TO RELATED APPLICATIONS

This application is a continuation of International Application No. PCT/CN 2021/140270, filed on Dec. 22, 2021, which claims priority to Chinese Patent Application No. 202011541530.9, filed on Dec. 23, 2020. The disclosures of the aforementioned applications are hereby incorporated by reference in their entireties.

TECHNICAL FIELD

This application relates to the computer field, and specifically, to a quick start method and apparatus in a troubleshooting phase, and a computer-readable storage medium.

BACKGROUND

When a fault occurs in a system in a process of executing a service, a computer usually needs to be restarted to ensure normal running of the service. During this period, all services executed by the computer may be "killed", which interrupts the services. The more quickly the computer restores, or the shorter time required from the computer fault to completion of restart is, the shorter service interruption time is. Therefore, how to reduce time required for restarting the computer is an urgent problem that needs to be resolved. In particular, longer time required for restarting a device in a communication system indicates greater impact on a communication service.

SUMMARY

According to a first aspect, this application provides a quick start method. Different quick start methods are set for a software fault and a hardware fault.

For the software fault, the quick start method includes the following operations.

When a software fault occurs in a computer system, firmware receives a restart request, where the restart request indicates the firmware to restart system software. The restart request may be sent by an operating system to the firmware in response to the software fault. In response to receiving the restart request, the firmware loads an image of the system software to restart the system software. Compared with the conventional technology in which system software needs to be restarted and a hardware device needs to be reset when a fault occurs, in this method, when the software fault occurs, only the system software may be restarted, and a hardware device does not need to be reset, thereby shortening time consumed by unnecessary hardware reset.

In this method, a new instruction, namely, the restart request, is called through a customized API that complies with an interface specification. The restart request indicates the firmware to restart the system software without resetting the hardware device. The hardware device herein is a hardware component of a physical device that performs this method. The system software mainly refers to computer software developed for running or controlling hardware, for example, developer-oriented software such as the operating system, an interpreter, a compiler, a database management system, and a utility program. In this method, the system software may include at least one of the following: a hypervisor, a trusted execution environment, a host operating system, or an operating system of a virtual machine.

In an embodiment, the restart request may include a storage address of the image, and the firmware may obtain the image based on the storage address of the image to load the image of the system software.

The image of the system software may be an image of system software of a new version, or may be an image of system software of an original version.

In an embodiment, before the firmware loads the image of the system software and completes restart, the method further includes:

The firmware authenticates a verification file of the image based on the image and a signature file of the image. Then, the firmware parses the verification file and verifies the image based on the verification file.

According to a second aspect, this application provides a quick start method. The method includes:

When a hardware fault occurs, firmware receives a suspend request.

The firmware stores a snapshot of a hardware device. The snapshot of the hardware device includes status information of the hardware device. Generally, the status information of the hardware device is stored in a register. Therefore, the snapshot of the hardware device is actually a snapshot in the register that stores the status information of the hardware device, and content of the snapshot includes the status information of the hardware device. In a computer system, an application, an operating system, a hypervisor, and the firmware may have respective managed and controlled hardware components or hardware devices. When the hardware fault occurs, the application, the operating system, the hypervisor, and the firmware may store snapshots that are of the hardware devices and that correspond to the application, the operating system, the hypervisor, and the firmware.

The firmware restores a status of the hardware device based on the snapshot of the hardware device after resetting the hardware device. The suspend request indicates the computer system to reset the hardware device. However, after the hardware device is reset, the register used to store the status information of the hardware device is cleared. In this method, a RAM is used to store the snapshot of the hardware device, the RAM is not reset in a process of resetting the hardware device, data stored in the RAM is not cleared, and a speed of reading the snapshot from the RAM is quick, so that quick restart can be implemented.

According to a third aspect, this application provides a quick start apparatus, where the apparatus includes a receiving unit and a restart unit. The receiving unit is configured to: send a restart request to firmware when a software fault occurs, where the restart request indicates the firmware to restart system software. In response to the restart request, the restart unit is configured to load an image of the system software to restart the system software.

In an embodiment, the restart request indicates the firmware to restart the system software without resetting a hardware device.

In an embodiment, the restart request includes a storage address of the image, and the restart unit is configured to obtain the image based on the storage address of the image.

In an embodiment, the apparatus includes a verification unit, and the verification unit is configured to authenticate a verification file of the image based on the image and a signature file of the image; and parse the verification file, and verify the image based on the verification file.

In an embodiment, the system software includes at least one of the following: a hypervisor, the firmware, a trusted execution environment, a host operating system, or an operating system of a virtual machine.

In an embodiment, the restart unit is further configured to receive the restart request through an application programming interface, where the application programming interface is a customized interface that complies with an interface specification.

According to a fourth aspect, this application provides a quick start apparatus, where the apparatus includes a receiving unit and a reset unit.

When a hardware fault occurs, the receiving unit is configured to receive a suspend request, where the suspend request indicates to reset a hardware device. The reset unit is configured to: store a snapshot of the hardware device; and restore a status of the hardware device based on the snapshot of the hardware device after the hardware device is reset.

In an embodiment, the snapshot of the hardware device includes status information of the hardware device, and the status information of the hardware device is stored in a register.

According to a fifth aspect, this application provides a quick start method. The method includes:

When a software fault occurs, an operating system receives a restart request, where the restart request indicates firmware to restart system software; the operating system sends the restart request to the firmware; and in response to the restart request, the firmware loads an image of the system software to restart the system software.

In an embodiment, the operating system calls an interface that complies with an interface specification to send the restart request to the firmware.

According to a sixth aspect, a quick start apparatus is provided, where the apparatus includes a processor and a memory. The memory stores computer instructions, and when the computer instructions are called by the processor, the apparatus performs the method described in any one of the first aspect, the second aspect, or the fifth aspect and the embodiments of the first aspect, the second aspect, or the fifth aspect.

According to a seventh aspect, a computer program product is provided, where the computer program product includes computer instructions. The computer instructions are called by a processor to perform the method described in any one of the first aspect, the second aspect, or the fifth aspect and the embodiments of the first aspect, the second aspect, or the fifth aspect.

According to an eighth aspect, a computer-readable storage medium is provided, where the computer storage medium includes computer instructions. The computer instructions are called by a processor to perform the method described in any one of the first aspect, the second aspect, or the fifth aspect and the embodiments of the first aspect, the second aspect, or the fifth aspect.

BRIEF DESCRIPTION OF DRAWINGS

FIG. 3*a* is a schematic diagram of a structure of a physical device with a virtualization function and a type 1 according to an embodiment of this application;

FIG. 3*b* is a schematic diagram of a structure of a physical device with a virtualization function and a type 2 according to an embodiment of this application;

DESCRIPTION OF EMBODIMENTS

Figure 1:
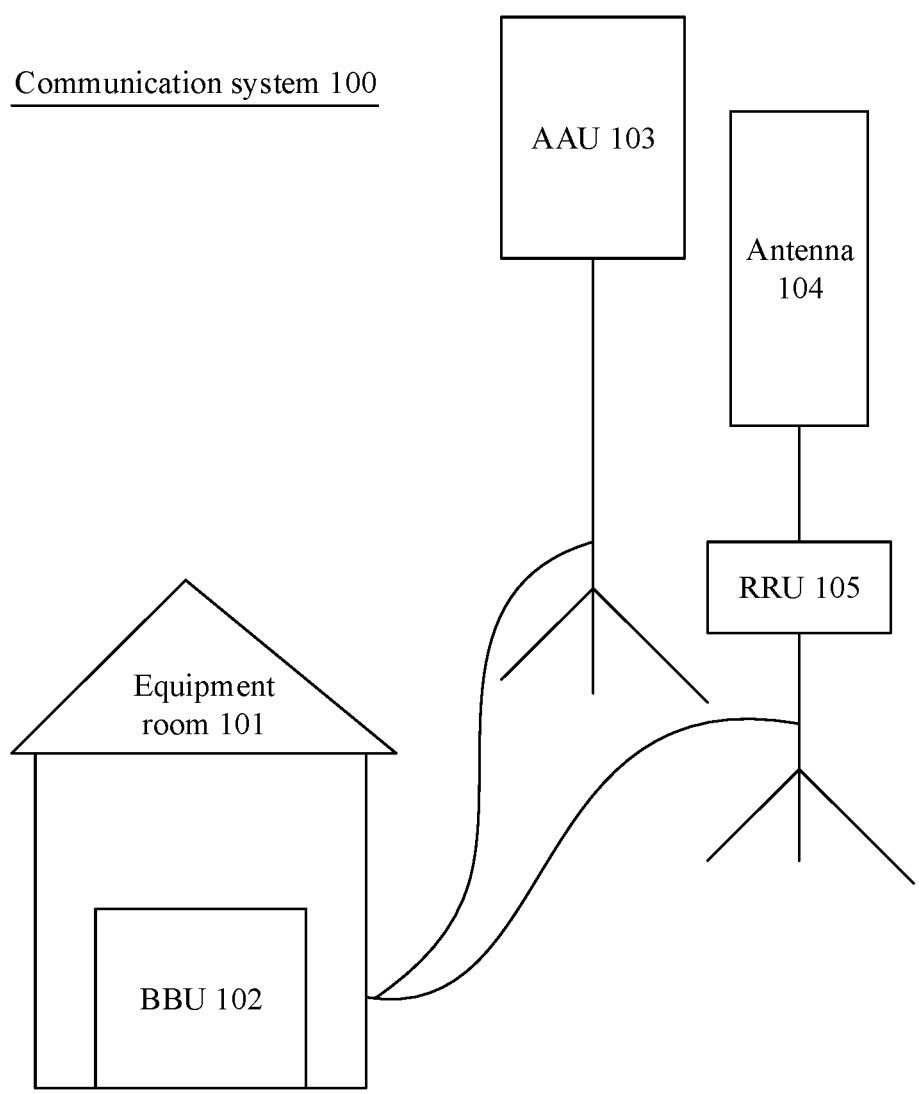
FIG. 1 is an architectural diagram of a communication system according to this application.

A communication system 100 (for example, a base station) shown in FIG. 1 includes a building baseband unit (BBU). For a 4G station, the communication system 100 may further include a remote radio unit (RRU) and an antenna. For a 5G station, the communication system 100 may include an active antenna unit (AAU). In some embodiments, as shown in FIG. 1, the base station may include an AAU 103, and may further include an antenna 104 and an RRU 105. In addition, a BBU 102 of the base station may be disposed in an equipment room 101. When the equipment room 101 is a central office (CO), the equipment room 101 may include respective BBUs of a plurality of base stations. To manage and schedule these BBUs in a unified manner, the BBUs can be virtualized. In short, in the past, each BBU is an independent physical device. Now, a plurality of virtual machines can be created on a server, and software with a BBU function can run on each virtual machine, so that the server can implement functions of a plurality of BBUs, and the server can manage and schedule these BBYs in a unified manner. However, regardless of a virtualized server that can be used to control and manage a plurality of pieces of BBU software or a BBU used as an independent physical device, a restart process includes: Taking software and hardware offline, and then restarting the software and the hardware. As a result, restart takes an excessive amount of time, interruption time of a communication service is increased, and communication experience of a user is affected.

A quick start method provided in this application is applicable to a physical device with a virtualization function, for example, the server with the BBU function. The following describes a system architecture to which this application is applicable and a related concept in the virtualization field.

Virtualization means virtualizing hardware resources of a physical device (for example, computing resources provided by a processor or storage resources provided by a memory) and allocating the virtualized resources to a plurality of virtual machines for use. Users use the virtual machines as if they were using physical computers.

The virtual machine (VM) is a virtual computer simulated on the physical device (which may also be referred to as a physical machine or a host machine) by using virtualization software. The virtual computer is a general name of a running environment virtualized by using the software. Each virtual machine can be configured with unique computing resources and storage resources. A guest operating system (guest OS) may be installed on the virtual machine. One or more applications may run on the guest operating system. The physical device herein may be the server mentioned above, and the server may have an AAU function or the BBU function.

A hypervisor, also referred to as a virtual machine monitor (VMM), may be used to create and run the virtual machine.

A host operating system (host OS) may be understood as a host operating system or an operating system of a physical host, and is used to manage and allocate hardware resources of a physical device, implement virtual machine scheduling and isolation, and the like. The hypervisor may be deployed in or outside the host OS.

A hardware layer may include a processor and a memory, and may further include a communication interface, for example, a network interface card (NIC). The hardware layer may further include an interrupt controller, an input/output (I/O) device, and the like. The processor may include a plurality of physical cores.

Figure 2A:
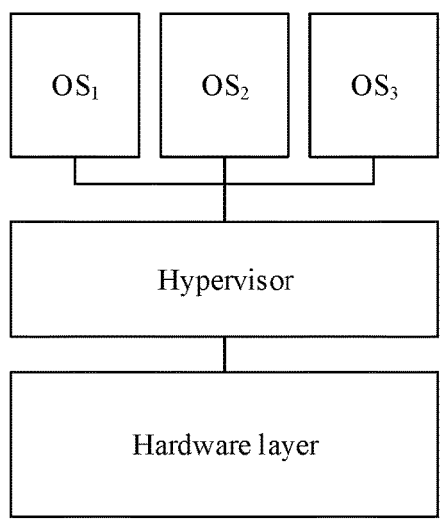
FIG. 2*a* is a schematic diagram of a virtualization system architecture of a type 1 according to an embodiment of this application.
Figure 2B:
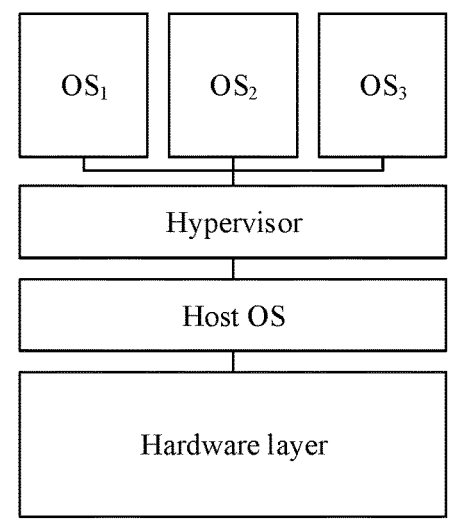
FIG. 2*b* is a schematic diagram of a virtualization system architecture of a type 2 according to an embodiment of this application.

Based on positions of hypervisors in system architectures, the virtualized system architectures may be classified into two types: a type 1 and a type 2. FIG. 2a and FIG. 2b are schematic diagrams of two system architectures of a physical device.

As shown in FIG. 2a, in a system architecture of a type 1, there is no concept of a host OS, and a hypervisor runs on a hardware layer of the physical device and is used to control and manage components at the hardware layer and guest OSs (a guest $OS_1$ to an $OS_3$ in FIG. 2a). The guest OS may be an operating system such as Linux, Windows, Android, or iOS. The hypervisor herein is often referred to as a native or bare-metal hypervisor.

As shown in FIG. 2b, a host OS runs on a hardware layer of the physical device, and a hypervisor equivalent to a process runs on the host OS. The hypervisor is often referred to as a hosted hypervisor. A plurality of virtual machines created and run by the hypervisor have respective OSs, for example, a guest $OS_1$ to an $OS_3$ in FIG. 2b. The hypervisor may be a software module in the host OS, in other words, the host OS may also have a function of the hypervisor. The hypervisor may alternatively be a software module that is located outside the host OS but interacts with the host OS. In an embodiment, the host OS is a Linux OS.

Actually, as shown in FIG. 3a and FIG. 3b, the physical device may further include firmware. Because the firmware is a type of software embedded in a hardware device and includes computer instructions, the firmware is divided into a software layer based on logic. A basic input/output system (BIOS) is a common type of firmware that performs hardware initialization in a power-on boot phase and provides a runtime service for an operating system. Computer instructions in the BIOS may be stored on a mainboard, and may be stored in a read-only memory (ROM), or may be stored in a flash memory. The computer instructions included in the firmware may implement a corresponding function after being called by a processor, and an interface for calling the firmware may comply with a specification of an instruction set supported by the hardware device.

The hardware devices in FIG. 3a and FIG. 3b may be components at the hardware layers in FIG. 2a and FIG. 2b.

Overall system architectures in FIG. 3a and FIG. 2a are similar, and hypervisors are located in a same position in the system architectures, and both run on hardware devices. Another guest OS and a guest OS (e.g., Linux) in FIG. 3a each correspond to one of the guest $OS_1$ to the $OS_3$ in FIG. 2a, and run on the hypervisor. The guest OS (e.g., Linux) indicates that a type of the guest OS may be Linux. An application of the guest OS may further run on the guest OS (e.g., Linux), for example, a system monitor. The system monitor is used to monitor whether a fault occurs.

Overall system architectures in FIG. 3b and FIG. 2b are similar. A host OS (e.g., Linux) and the hypervisor run on the hardware device, and a guest OS of a virtual machine may run on the host OS (e.g., Linux). A system monitor is used to monitor whether a fault occurs. The system monitor can run on the host machine as one of applications of the host machine or run on the guest OS as one of applications of the virtual machine. In the system architecture of a type 2 mentioned above, the hypervisor may be deployed in the host OS, or may be deployed outside the host OS. In FIG. 3b, Linux is used as the host OS, and the hypervisor may be located in the host OS. The guest OS in FIG. 3b is one of the guest $OS_1$ to the $OS_3$ in FIG. 2b.

As shown in FIG. 3a and FIG. 3b, the software layer includes the firmware, the operating system, the hypervisor, and the application. In consideration of system security, a corresponding privilege level may be set for each software module at the software layer. In different instruction set architectures, representation forms of the privilege level are different.

Figure 4:
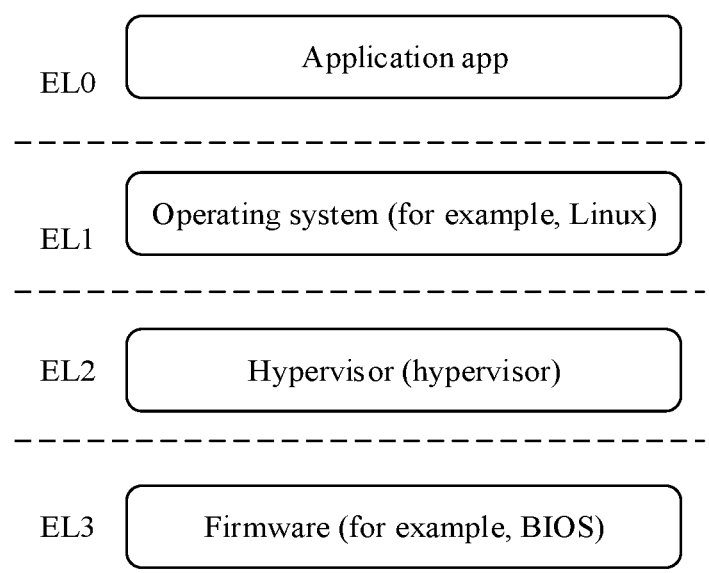
FIG. 4 is a schematic diagram of privilege levels at a software layer according to an embodiment of this application.

An advanced reduced instruction set computer machine (ARM) architecture is used as an example. The software layer of each of the system architecture of the two types shown in FIG. 3a and FIG. 3b may be divided into a privilege level model shown in FIG. 4 based on privilege levels. As shown in FIG. 4, the software layer may include the application (APP), the operating system (for example, Linux), the hypervisor, and the firmware (for example, the BIOS). As shown in FIG. 4, the privilege level model of the ARM architecture has different privilege levels (which may also be referred to as exception levels), and different access levels of different software modules at the software layer for resources are presented. One representation form of the privilege level may be EL<x>, where x is an integer between 0 and 3, including 0 and 3. For example, a lowest privilege level is EL0. Generally, a privilege level of the application is EL0, a privilege level of the operating system is EL1 a privilege level of the hypervisor is EL2, and a privilege level of the firmware is EL3. From the EL0 to the EL3, the privilege level can be gradually increased. A larger number indicates a higher privilege level. A software module with a high privilege level has a higher level of access to resources than a software module with a low privilege level. In other words, the software module with the high privilege level has a greater access right. Conversion from executing the software module with the low privilege level to executing the software module with the high privilege level requires privileged level conversion, and vice versa. It should be noted that, in the foregoing system architecture of a type 1, a privilege level EL1 of the guest OS is less than the privilege level EL2 of the hypervisor, while in the foregoing system architecture of a type 2, a privilege level EL1 of the host OS may be equal to the privilege level EL2 of the hypervisor. It may be understood that, in the ARM architecture, the representation form of the privilege level may be EL<x>, and in another system architecture, another representation form of the privilege level may be used. For example, in an X86 architecture, Ring 0 to Ring 3 are used to indicate different privilege levels.

A quick start method provided in this application may be applied to the foregoing system architectures. This application proposes corresponding quick start methods for a software fault and a hardware fault that occur in a physical device. When it is detected that the software fault or the hardware fault occurs, the method provided in this application can be used to quickly complete a restart process. The software fault refers to a fault that occurs in software. For example, in a link heartbeat detection process, a sent detection instruction is not responded for a long time. An interrupt request is triggered but an interrupt handler is not executed. The hardware fault refers to a fault that occurs in hardware. For example, a memory exception is detected during memory verification. When an error is determined, the fault is notified in a form of an exception or an interrupt.

The ARM architecture and other instruction set architectures all provide specifications for a power management interface and provide a developer with an interface that can be customized. The developer can set new instructions with new functions based on the customized interface.

A new restart request provided in this application may be implemented through the customized interface that meets a power state coordination interface (PSCI) specification. The PSCI is a power management interface specification defined by the ARM architecture. According to the method provided in this application, the restart request may be sent to firmware by calling the interface.

For the software fault, the firmware in this application responds to the restart request and starts an image file of system software to restart the software. The restart request indicates to start the image file of the system without performing a hardware reset process. Compared with performing hardware reset and software restart once regardless of a fault type, this application can reduce unnecessary time consumption. For example, when the software fault occurs, in this application, only the software may be restarted, and the hardware does not need to be reset. Compared with the conventional technology, time consumed in a hardware initialization phase in a start process is reduced, and a system start speed is accelerated. In addition, a software restart process in this application is initiated by the firmware, and the firmware has a high privilege level and high security. This can further ensure that the software restart process is not easily attacked while implementing quick start.

For the hardware fault, the firmware in this application performs hardware reset and snapshot restoration in response to the restart request. When the hardware fault occurs, a snapshot of a status of the hardware device is stored before reset. Therefore, after the hardware is reset, the hardware device may use the snapshot to restore to the status before the reset, thereby implementing quick start of the system. In addition, reset of the hardware is triggered by the firmware, which can ensure security and trustworthiness of the start process while implementing quick start.

It should be noted that the software restarted in software restart may be original software or new software. In other words, the software restart may be restarting the original software, or may be starting the new software and replacing the original software with the new software. Hardware reset is a process of restoring the status of the hardware to an initial setting by restarting the hardware.

The following describes in detail an embodiment of the quick start method provided in this application when the software fault occurs.

In the software fault-based quick start method provided in this application, a customized restart request is implemented based on a customized API provided in an interface specification. When the software fault occurs in the physical device, the BIOS of the physical device receives the restart request, and loads the image of the system software in response to the restart request, to complete restart of the system software.

Figure 5:
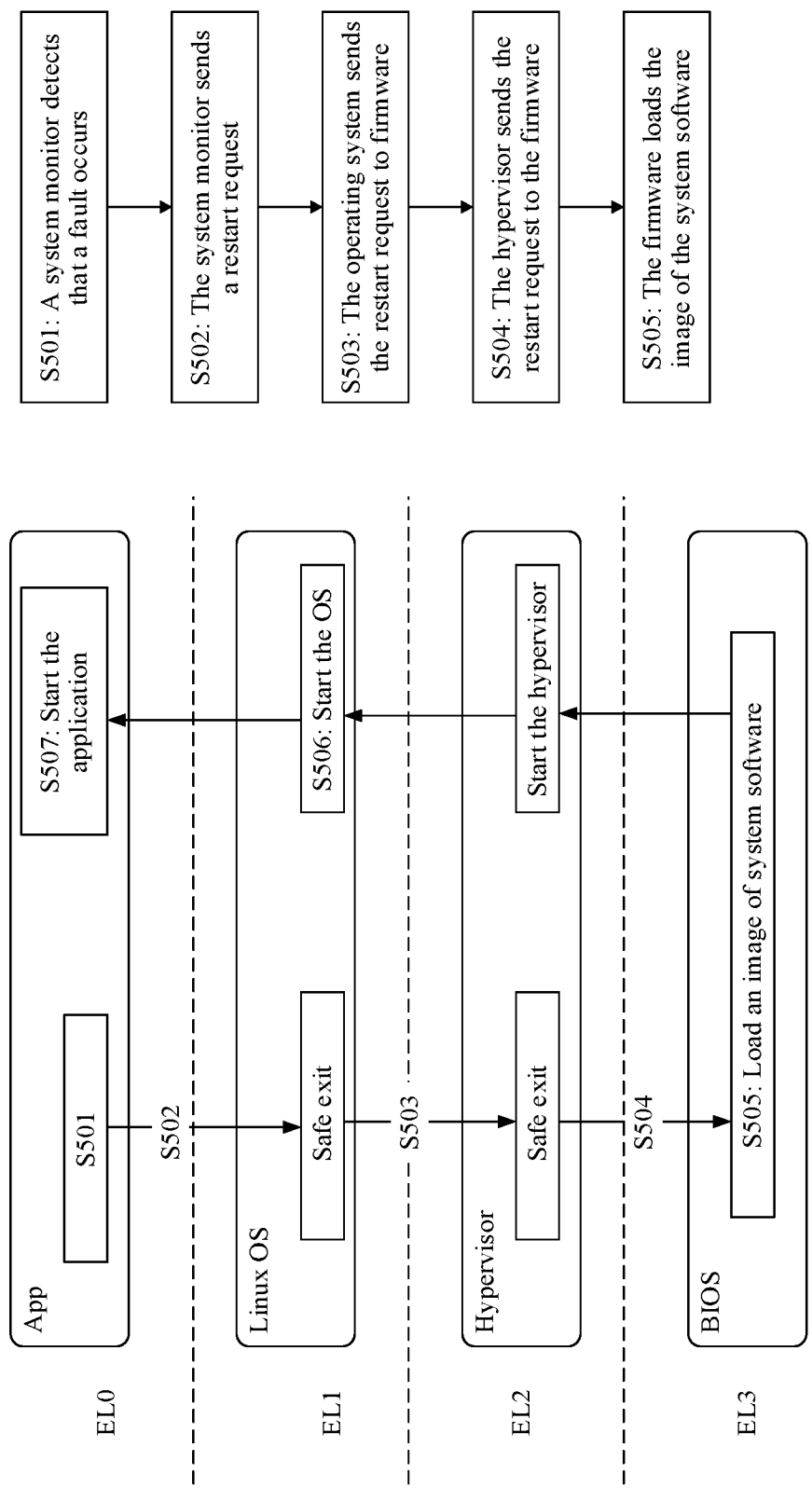
FIG. 5 is a schematic flowchart of a quick start method according to an embodiment of this application.

As shown in FIG. 5, a quick start method provided in this application may include the following operations.

Operation 501: A system monitor detects that a fault occurs.

There are a plurality of embodiments in which the system monitor monitors whether a software fault occurs. In an embodiment, the system monitor may periodically check various software modules in a system to monitor whether the fault occurs. In another embodiment, the system monitor may further receive a fault prompt to know whether the fault occurs. In other words, when the software fault occurs, the fault prompt is typically triggered.

When detecting that a fault occurs, the system monitor notifies another application (for example, an application for executing a service) to safely exit, preventing data loss during service processing. It should be noted that safe exit mentioned in this application means that a program is closed according to a normal exit procedure, instead of being suddenly closed. In the normal exit procedure, context of the program to be exited is stored, so that after being restarted, the program can be restored to a status before exit. The context stores data of the running status of the program before exit.

Operation 502: The system monitor sends a restart request.

The restart request is an instruction called by a customized API that complies with an interface specification. Software and hardware design of a physical device may comply with an instruction set architecture specification supported by the physical device. The instruction set architecture interface specification provides a developer with an API that can be customized. The developer may call, through the customized API, a new instruction used to implement a customized function. Because the new instruction complies with the interface specification, components or modules at a software layer and a hardware layer may perform corresponding functions in response to the instruction. In this application, the system monitor calls the restart request through the customized API. The restart request indicates firmware (for example, a BIOS in FIG. 5) to load an image of system software. In this application, the restart request indicates to load the image of the system software to restart the system software, without performing a reset procedure of each component at the hardware layer. Therefore, an unnecessary hardware reset process is skipped, and time occupied by hardware reset is cut down.

The system monitor is usually a user-mode application, and has a low privilege level. The restart request indicates the firmware to perform an operation of restarting the system software, and the firmware has a high privilege level, as shown in FIG. 4. Therefore, before the firmware receives the restart request, the restart request may need to be transferred to the firmware through an operating system and a hypervisor. Therefore, before the firmware receives the restart request, this method may further include operation 503, or may further include operation 504, in other words, operations 503 and 504 are optional.

The system monitor may execute a system call to request, from the operating system, a service that requires a higher privilege to run, to be specific, to request to send the restart request to the firmware in this method. The system call provides an interface between the application and the operating system. A process of executing the system call includes privilege level switching, from a privilege level of the application to a privilege level of the operating system.

Operation 503: The operating system sends the restart request to the firmware.

In response to receiving the restart request, the operating system forwards the restart request to the firmware. A processor includes a plurality of physical cores, and a primary core and a secondary core are disposed in the plurality of physical cores. Specifically, when the operating system safely exits, the secondary core of the processor is set to an offline state, and an online state of the primary core is maintained. After the operating system safely exits, the online primary core sends the restart request to the firmware.

In an embodiment, the operating system may perform safe exit of the operating system in response to the restart request. Similar to the safe exit mentioned above, the safe exit is used to prevent the following case: Data generated during running of the operating system is lost when the operating system is suddenly closed. Specifically, the operating system stores context, so that a status before exit is restored after restart. The context stores data of the running status of the operating system before exit.

Operation 504: The hypervisor sends the restart request to the firmware.

For the system architecture of a type 1, refer to FIG. 3a. The operating system runs on the hypervisor. Therefore, the restart request sent by the operating system to the firmware is intercepted by the hypervisor, and the hypervisor transparently transmits the request to the firmware (for example, the BIOS in FIG. 5).

For the hypervisor of a type 2, refer to FIG. 3b. The hypervisor may be located in the operating system, and the hypervisor and the operating system may be located at a same privilege level and have a same privilege level. Therefore, after the operating system receives the restart request, the operating system may directly send the restart request to the firmware (for example, the BIOS in FIG. 5).

The privilege level switches from the privilege level of the operating system or a privilege level of the hypervisor to a privilege level of the BIOS. For the system architecture of a type 1, the privilege level is switched from the privilege level EL2 of the hypervisor to a privilege level EL3 of the BIOS. For the system architecture of a type 2, a privilege level EL1 of the operating system and the privilege level EL2 of the hypervisor may be a same privilege level. Therefore, the privilege level is switched from the privilege level EL1 of the operating system to the privilege level EL3 of the BIOS. The privilege level is switched by using a status register of the processor. The status register stores information indicating privilege levels. The processor accesses the information stored in the status register to learn of a current privilege level.

In an embodiment, in response to receiving the restart request, the hypervisor performs safe exit in the same way as the operating system and the application described above, in other words, stores context existing during running of the hypervisor, so that when an image of the hypervisor is restarted, the stored context may be used to restore a status before exit.

Operation 505: The firmware loads the image of the system software.

In response to receiving the restart request, the firmware loads the image of the system software to restart the system software. The image is a form of file storage, and means that data in one storage space has a same copy in another storage space. The image of the system software mentioned herein may be an image of system software originally running on the physical device, or may be an image of new system software used to replace originally running system software. In this application, the restart request indicates to load the image of the system software to restart the system software, without performing the hardware reset process of the physical device. Therefore, the unnecessary hardware reset process is skipped, and the time occupied by hardware reset is cut down.

Further, in existing Linux kexec, replacement of a new operating system with an old operating system is completed by starting a kernel of the new operating system by using the old operating system, and the old operating system is vulnerable to an attack. Consequently, a start process of the new operating system is insecure. However, in this method, the firmware is used to restart the system software, and the firmware has higher security than the operating system. Therefore, this method can further ensure security in a restart process.

In addition, the system software mentioned in this method may include the operating system and the hypervisor. For example, for the system architecture of a type 1, the system software may include the hypervisor and a guest operating system, and for the system architecture of a type 2, the system software may include the hypervisor and a host operating system. Further, if the system architecture involves a trusted execution environment, the system software may further include the trusted execution environment. In other words, compared with the existing Linux kexec that is applicable only to starting the new operating system, this method can support loading a new operating system, a new hypervisor, and a new trusted execution environment to replace an original operating system, an original hypervisor, and an original trusted execution environment respectively. The trusted execution environment (TEE) is a concept relative to a rich execution environment (REE). A non-secure operating environment and a secure operating environment may be deployed on the physical device. The non-secure running environment is the REE, and runs operating systems such as Android, iOS, Windows Phone, and Linux. The secure operating environment is the TEE, and runs a secure operating system. Software and hardware resources accessed by the TEE are isolated from the REE. Software and hardware resources on the physical device may be identified respectively as two execution environment states. Software and hardware resources identified as a secure execution state can be accessed only by the TEE execution environment, and software and hardware resources identified as a non-secure execution state can be accessed by the two execution environments. A secure running environment isolated from the REE is constructed in the TEE, and can provide a secure execution environment for authorized trusted software.

In an embodiment, in a process in which the firmware loads the image of the system software, the firmware further may verify the image of the system software, to verify security of the image. Firstly, the firmware performs signature authentication on an initialization (ini) file based on the image, and a storage address and a length of a signature file of the image in storage space, to authenticate validity of an image file. Secondly, the ini file is parsed, and an image file is verified based on a hash value included in the ini file. After verification is complete, the firmware loads each image in the image file to restart the system software, and does not perform hardware reset, in other words, skips the hardware reset process.

Operations 501 to 505 describe a process from detecting the fault to loading the image of the system software. After operation 505, this method may further include a process of restoring normal running of the loaded system software. In this process, restoration may be performed in sequence from the firmware with the high privilege level to the application with the low privilege level, as shown in FIG. 5.

Operation 506: For the system architecture of a type 1, the hypervisor boots the guest operating system.

After loading the image of the hypervisor, the firmware may restore the context of the hypervisor to the status before exit by using the context of the hypervisor stored in the foregoing operation 504. The hypervisor may restore the context of the operating system to the status before exit by using the context of the operating system stored in the foregoing operation 503. The started guest operating system restores the offline secondary core of the processor to an online state.

Operation 507: The operating system starts applications such as the system monitor and the foregoing application for executing the service.

The operating system restores the context of the application to the status before exit by using the context of the application stored in the foregoing operation 501.

Operation 508: The application is restored to a normal state, and the service can be executed normally.

The following describes in detail an embodiment of the quick start method provided in this application when the hardware fault occurs.

Figure 6:
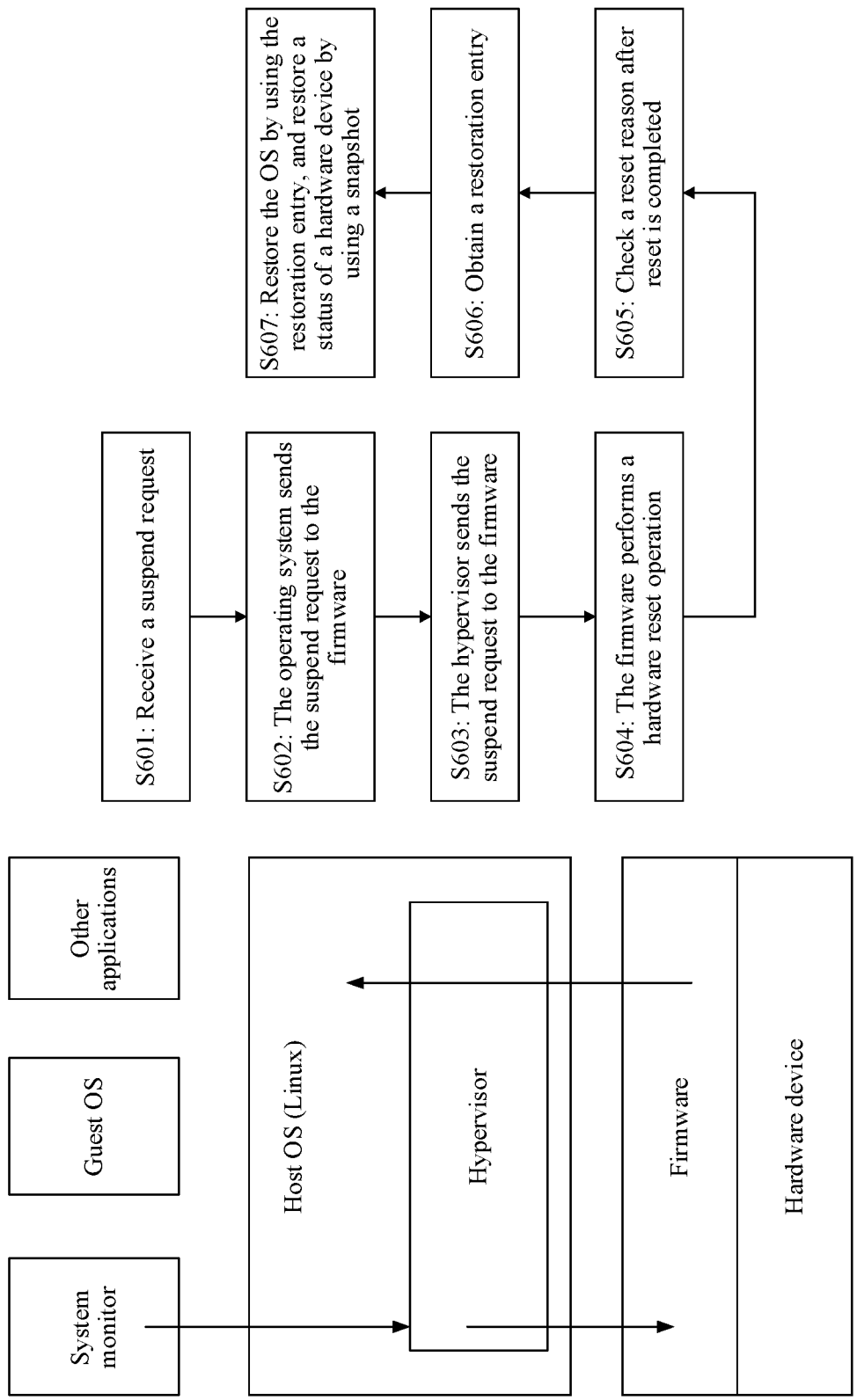
FIG. 6 is a schematic flowchart of a quick start method according to an embodiment of this application.

As shown in FIG. 6, a quick start method provided in this application may include the following operations.

Operation 601: Receive a suspend request.

The suspend request may be delivered through a state interface. When a hardware fault occurs, a system monitor triggers the suspend request by calling the state interface. The suspend request indicates firmware to reset a hardware device, and reset means restoring the hardware device to an initial status.

In an embodiment, the suspend request further indicates to store a snapshot of the hardware device. The snapshot of the hardware device mentioned herein is a snapshot in a register used to store status information of the hardware device. In a computer system, processes at different privilege levels may control corresponding hardware devices respectively. Therefore, when the suspend request is transferred to each privilege level, storage of a snapshot of a hardware device controlled at the corresponding privilege level is triggered. For example, the suspend request triggers an application at a privilege level EL0 to store a snapshot of a hardware device controlled by the application.

The system monitor is usually a user-mode application, and has a low privilege level. The suspend request indicates the firmware to reset the hardware, and the firmware has a high privilege level, as shown in FIG. 4. Therefore, before the firmware receives the suspend request, the suspend request may be transferred to the firmware through an operating system and a hypervisor. Therefore, before the firmware receives the suspend request, this method may further include operation 602, or may further include operation 603, in other words, operations 602 and 603 are optional.

The system monitor may execute a system call to request, from the operating system, a service that requires a higher privilege to run, to be specific, to request to send the suspend request to the firmware in this method. The system call provides an interface between the application and the operating system. A process of executing the system call includes privilege level switching, from a privilege level of the application to a privilege level of the operating system.

Operation 602: The operating system sends the suspend request to the firmware.

In response to receiving the suspend request, the operating system forwards the suspend request to the firmware. The operating system may further store status data during running of the operating system in a memory in a form of a snapshot. Specifically, the status data may be stored in a RAM. For example, the status data during running of the operating system may be process context, a data structure managed by a process, a data structure of a file system, or the like.

In an embodiment, in response to receiving the suspend request, the operating system stores a snapshot of a hardware device controlled by the operating system.

In an embodiment, the operating system may further send a restoration entry of system software to the firmware, where the restoration entry is a code storage address. In this way, after hardware reset is completed, the firmware may restore the system software to normal running based on the restoration entry.

Operation 603: The hypervisor sends the suspend request to the firmware, where the suspend request indicates the firmware to reset the hardware device.

For the system architecture of a type 1, refer to FIG. 3*a*. The operating system runs on the hypervisor. Therefore, the restart request sent by the operating system to the firmware is intercepted by the hypervisor, and the hypervisor transparently transmits the request to the firmware (for example, a BIOS in FIG. 6).

In an embodiment, in response to receiving the suspend request, the hypervisor stores a snapshot of a hardware device controlled by the hypervisor.

For the hypervisor of a type 2, refer to FIG. 3*b*. The hypervisor may be located in the operating system, and the hypervisor and the operating system may be located at a same privilege level and have a same privilege level. Therefore, after the operating system receives the restart request, the operating system may directly send the restart request to the firmware (for example, the BIOS in FIG. 6).

In response to receiving the suspend request, the hypervisor may store status data during running of the hypervisor in the memory in the form of a snapshot.

In an embodiment, the hypervisor may further forward the restoration entry of the system software to the firmware.

Operation 604: The firmware performs a hardware reset operation.

The firmware receives a suspend instruction, and the suspend instruction is called through a new API. In response to receiving the suspend instruction, the firmware performs a reset operation on hardware other than the memory, and restores settings of the hardware other than the memory to initial statuses. The suspend request mentioned in this method indicates the firmware to perform the reset operation on the hardware other than the memory in the hardware device, without restarting the system software. Specifically, a reset operation may be performed on a hardware device other than the RAM.

In an embodiment, before performing the reset operation, the firmware may store a snapshot of a hardware device controlled by the firmware. The snapshot of the hardware device includes the status information of the hardware device, and the status data of the hardware device is usually recorded in the register. When the reset operation is performed on the hardware device, the register used to record the status information of the hardware device is cleared, and the status information of the hardware device recorded in the register is cleared. However, information stored in the memory is not cleared because the memory is not powered off in a reset process. In this method, the status information of the hardware device recorded in the register is stored in the memory in the form of a snapshot, and a status of the hardware device may be restored subsequently by using the stored snapshot.

In an embodiment, the firmware further records a reason why reset is triggered, that is, a reason that causes the hardware fault. If the reset operation is triggered by the foregoing suspend request, the reset reason is that the foregoing suspend request is received and the hardware fault that triggers the suspend request.

In an embodiment, the firmware stores the received restoration entry in the memory.

Operation 605: Check the reset reason after reset is completed.

A ROM stores executable code. When the executable code is called, the executable code is used to check the reset reason. The reset reason is a reason why reset is initiated, namely, the reason that causes the hardware fault.

Operation 606: Obtain the restoration entry.

When the executable code in the ROM is called, the restoration entry may be obtained from the RAM based on the previously determined reset reason. To be specific, a code storage address of the system software is obtained.

Operation 607: Restore the OS through the restoration entry, and restore the status of the hardware device by using the stored snapshot of the hardware device.

Because the restoration entry is the address of storing the code of the system software, the system software may be executed based on the address of the code, and running of the system software may be resumed.

The firmware may further restore the status of the hardware device based on a snapshot of a hardware device stored in the RAM. The snapshot of the hardware device is the snapshot in the register that stores the status of the hardware device. Therefore, the snapshot in the register is used to restore the information stored in the register before reset. When the reset operation is performed on the hardware device, the register is cleared, and the status information of the hardware device recorded in the register is cleared. However, information stored in the RAM is not cleared because the RAM is not powered off in the reset process. In this method, the status information of the hardware device recorded in the register is stored in the RAM in the form of a snapshot, and the status of the hardware device may be restored subsequently by using the stored snapshot.

In some embodiments, the firmware restores a status of the operating system by using the foregoing stored snapshot of the operating system. The firmware may further restore a status of the hypervisor by using the foregoing stored snapshot of the hypervisor. Because the RAM is not reset, the information stored in the RAM is not cleared due to reset. Because a read/write speed of the memory is extremely fast, it takes short time to restore a status of the system software or a status of the register in a form of a memory snapshot.

In some embodiments, for a hardware device that cannot store status information of a register of the hardware device, hardware may be re-initialized.

The following describes details of the quick start method provided in this application based on an example wireless base station scenario.

Figure 7:
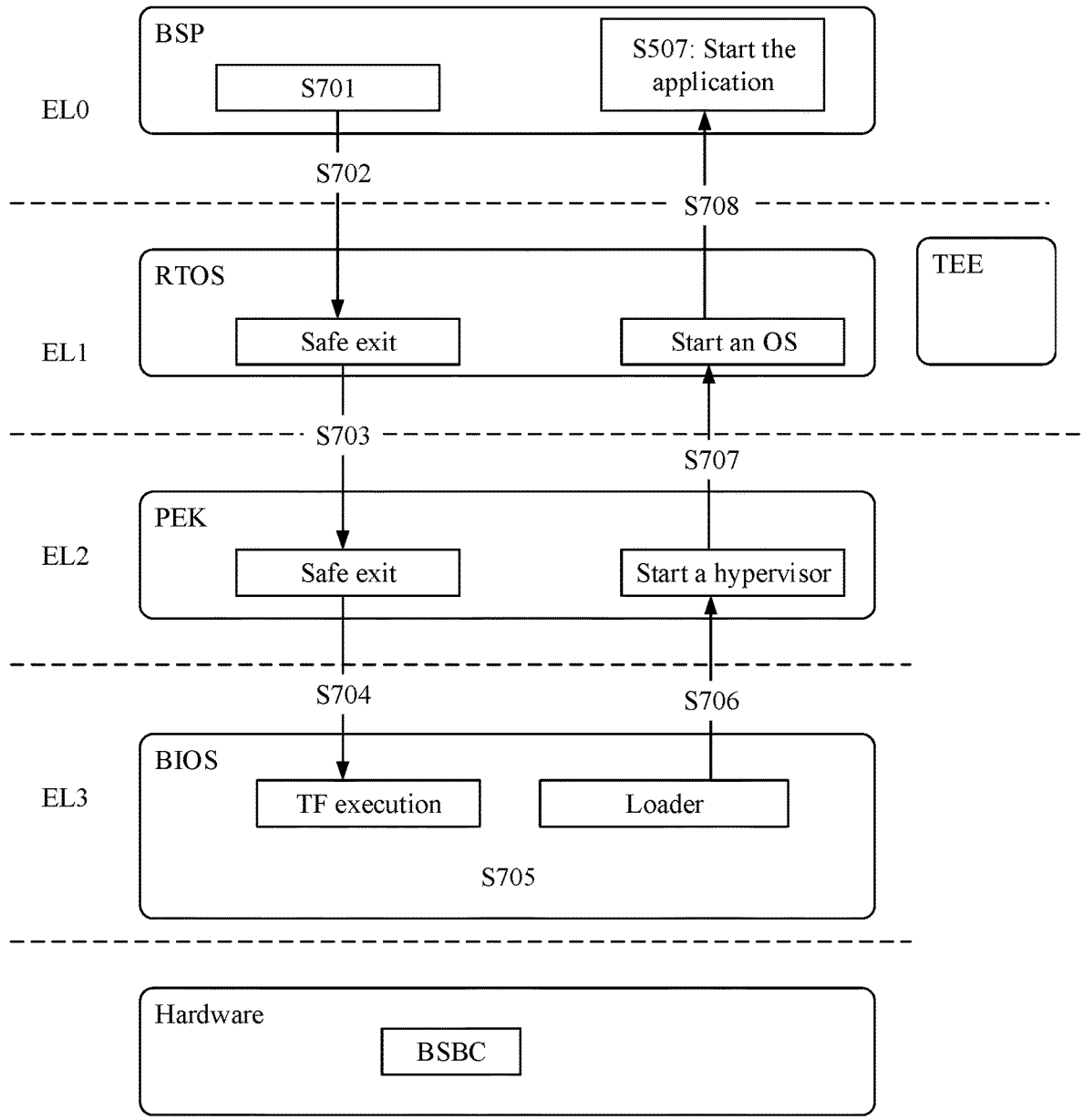
FIG. 7 is a schematic flowchart of a quick start method according to an embodiment of this application.

As shown in FIG. 7, a physical device (for example, an AAU or a BBU) in the wireless base station scenario includes a board support package (BSP) at a privilege level EL0. The BSP typically includes a bootloader that loads an operating system with basic support code, and drivers of devices on a motherboard. An operating system at EL1 may include a real-time operating system (RTOS). Compared with a common operating system, a biggest feature of the real-time operating system is real-time performance. If a task is to be executed, the real-time operating system executes the task in short time without a long delay. This feature ensures timely execution of each task. The operating system at the EL1 may further include a TEE, and in this case, the RTOS is equivalent to an REE. A hypervisor at EL2 may be a protected environment keystone (PEK), and a function of the PEK is similar to that of a common hypervisor. A BIOS of the physical device in FIG. 7 may include trusted firmware and a loader. The trusted firmware may be used to receive a restart request transferred by a system monitor through the operating system and the hypervisor, and notify the loader of loading an image of system software. In this embodiment, the system software includes the TEE, the PEK, and the RTOS. Correspondingly, the loaded image includes an image of the TEE, an image of the PEK, and an image of the RTOS.

The trusted firmware (TF) may also be referred to as security firmware, and is a component of firmware. In an advanced reduced instruction set computer machine (ARM) architecture, the trusted firmware may provide a reference implementation of security software for the ARM architecture. A reduced instruction set computer (RISC) or a simplified reduced instruction set is a design pattern of a central processing unit of a computer. The trusted firmware provides a reference trusted code base for a system-on-chip (SoC) developer and an original equipment manufacturer (OEM), and the code base complies with an ARM specification. Because the restart request is implemented based on a PSCI interface specification, the restart request can be received and recognized by the trusted firmware, and can be used by the trusted firmware to load an image of a new system.

Operation 701: When the BSP detects that a software fault occurs, the BSP copies the images of the TEE, the PEK, and the RTOS from a file system to a double data rate synchronous dynamic random access memory (DDR SDRAM). Specifically, temporary storage space may be dynamically allocated to the images in the DDR SDRAM, and subsequently the trusted firmware may read the image of the system software from the DDR SDRAM.

In an embodiment, a storage address of the image of the system software in the DDR SRAM is sent to the trusted firmware TF, and the TF may read the image of the system software from the DDR SDRAM based on the received storage address.

Operation 702: The BSP sends a reset2 instruction to the BIOS, and traps in the RTOS.

Herein, the reset2 instruction is a restart instruction, and the instruction is used to instruct the BIOS to load the image of the system software. "Trap-in" appears in a computer operating system, and is used to enable a process with a low privilege level to call a process with a high privilege level. To be specific, when the running process with the low privilege level is to request the process with the high privilege level to serve the running process with the low privilege level, a trap-in instruction may be executed to cause a special exception. The reset2 instruction is sent to the BIOS and may be forwarded by the RTOS and the PEK. When the reset2 instruction is transferred to the RTOS, because a privilege level of the RTOS is higher than a privilege level of the BSP, it is referred to as "trap in the RTOS". In an x trap-in process, privilege level conversion is required. Specifically, a value in a status register of a processor may be changed, and the processor can learn of a current privilege level by reading the value of the status register, and can also learn of a current operation permission and a current access permission.

The storage address of the image in the DDR SDRAM can be sent to the BIOS in the same way as the reset2 instruction. In an embodiment, the reset2 instruction may include the storage address, and the storage address is also sent to the BIOS when the reset2 instruction is transferred. In another embodiment, the storage address may alternatively be used as another piece of information other than the reset2 instruction and transferred to the BIOS through the RTOS and the PEK.

Operation 703: The RTOS disables control cores, calls a "system_reset2" interface, and traps into the PEK.

Among a plurality of physical cores in the processor, some physical cores are configured to control, configure, and initialize the system, and some physical cores are configured to perform data processing. In terms of functions, the physical core configured to control, configure, and initialize the system is referred to as the control core. Disabling is an antonym of enabling. Disabling the physical core means making the physical core offline.

The "system_reset2" interface is an API that can be customized by a developer and that complies with the PSCI interface specification. In this method, the reset2 instruction is transferred to the PEK by calling this interface. When the instruction is transferred to the PEK, because a privilege level of the PEK is higher than the privilege level of the RTOS, it is referred to as "trap in the PEK".

Operation 704: The PEK disables user cores, calls the "system_reset2" interface, and traps in the BIOS.

The PEK transparently transmits the reset2 instruction to the BIOS by calling this interface. When the instruction is transferred to the BIOS, because a privilege level of the BIOS is higher than the privilege level of the PEK, it is referred to as "trap in the BIOS".

Operation 705: The BIOS verifies, transfers, and loads the image of the system software.

The BIOS receives the reset2 instruction, and the BIOS restarts the system software in response to the reset2 instruction, but does not need to perform a hardware reset operation, in other words, a hardware restart process is skipped.

In response to the reset2 instruction, the TF verifies the image of the system software. After verification is complete, the TF notifies the loader in the BIOS of loading the image of the system software.

In an embodiment, the BIOS receives the storage address that is of the image in the DDR SDRAM and that is sent by the BSP. Therefore, the loader may read and load the image of the system software based on the storage address. Specifically, the images of the PEK, the RTOS, and the TEE may be loaded.

Operation 706: After the image of the PEK is loaded, the BIOS traps out of the PEK, and initializes the PEK.

As described earlier, trap-in refers to calling the process with the high privilege level by the process with the low privilege level, and trap-out refers to calling the process with the low-privilege level by the process with the high privilege level, involving switching from the high privilege level to the low privilege level.

Operation 707: After the image of the RTOS is loaded, the RTOS is trapped out of the PEK, and the RTOS is initialized.

Operation 708: Bottom-layer software/TRAN/iWare enables software and hardware statuses to be consistent with software and hardware statuses before exit.

Figure 8:
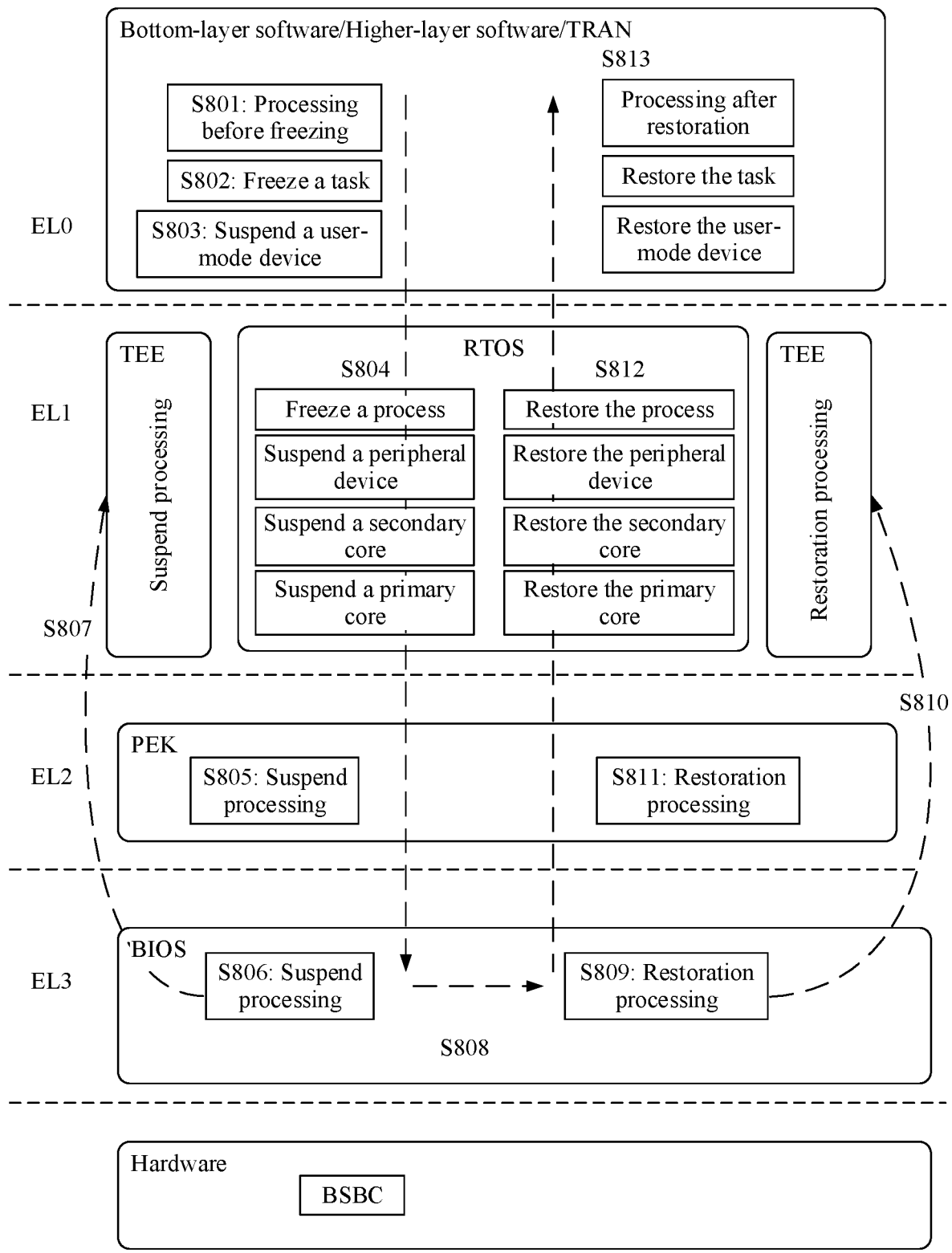
FIG. 8 is a schematic flowchart of a quick start method according to an embodiment of this application.

The following describes a quick start method provided in this application when a hardware fault occurs with reference to the wireless base station scenario. As shown in FIG. 8, the method includes the following operations.

Operation 801: After receiving a suspend request, a terrestrial radio access network (TRAN), bottom-layer software, or high-layer software first processes a hook, where the hook refers to a special position (e.g., mount point) in an ordered operation, and inserts customized content. A hook function is a function that an event is captured at a system level when the event is triggered and a corresponding operation is then performed. A name of the hook function is determined. When a system message is triggered, the hook function is automatically called. For example, for a componentWillUpdate function of react, a user may compile only a function body of componentWillUpdate. When a component status changes and is to be updated, a system calls the componentWillUpdate function.

Secondly, a status of an operating system kernel is stored, radio access (RAT) is safely exited, and communication of a base station device running this method is disabled.

Operation 802: Freeze a process other than a process that runs this method.

Process freezing is a mechanism for suspending a process when the system is hibernated or suspended. Specifically, a freezing signal is sent to the process, and the process automatically performs a freezing operation after receiving the signal. The frozen process may include a self-processing task or a message processing task.

Operation 803: Call back a user-mode driver, store a snapshot of a user-mode process, and traps in the RTOS.

The stored snapshot of the user-mode process is context of the user-mode process, and includes data generated during running of the user-mode process and configuration information generated during running. After the snapshot of the user-mode process is stored, the RTOS is trapped in and the suspend instruction is sent to the RTOS. A user mode and a kernel mode represent two running statuses of a processor, and a privilege level corresponding to a process in the user mode is lower than a privilege level corresponding to a process in the kernel mode. For example, an application is usually a user-mode process, and the RTOS, a PEK, and a TEE are usually kernel-mode processes.

Operation 804: The RTOS freezes a service-related process such as node, nodeitf, or sremng, calls back a suspend interface of the kernel, stores a snapshot of the kernel-mode process, and then traps in the PEK.

Specifically, a console and a peripheral device are suspended, and the secondary core is disabled and an interrupt is turned off.

Operation 805: The PEK stores a restoration entry of the RTOS, and stores context of the RTOS and the TEE. Then, the PEK calls a cpu_suspend(pek entry) command to trap in the BIOS. The cpu_suspend(pek entry) command is a suspend command that complies with an interface specification and indicates the BIOS to reset hardware. The restoration entry is an entry address of program code, namely, an address of the program code.

Operation 806: A TF in the BIOS stores a restoration address of the PEK, and calls the cpu_suspend interface to trap in the TEE.

Operation 807: The TEE stores a system register, and returns the TF with an entry address of the TEE.

Operation 808: The TF of the BIOS calls a 706 global soft reset register to reset the hardware. The TF may send a reset signal by writing the 706 global soft reset register, to enable the hardware to perform a reset operation.

Operation 809: The BIOS performs the hardware reset operation.

First, secure boot code (e.g., Boot ROM Secure Boot Code, BSBC) is executed. The BSBC is internal boot code of a chip (e.g., on-chip) and is integrated in a boot ROM of the chip. When the device is safely booted, a first software module executed by a CPU is used to authenticate a start process. Boot code is then executed. The boot code is code stored in a ROM for copying a to-be-executed program code into a RAM. Further, functions of a loader and the TF in the BIOS are executed.

The loader restores the TEE based on the entry address of the TEE, and further restores the PEK based on an entry address of the PEK.

Operation 810: After the TEE is initialized, return to the TF.

Operation 811: The PEK restores the RTOS based on an entry address of the RTOS.

Operation 812: Restore a primary core, restore context of a primary core register, turn on the interrupt, enable the secondary core, restore the peripheral device, initialize a kernel device, then restore the process, and restore the console.

Operation 813: Initialize a user-mode device, reload the RAT, and establish a cell.

Figure 9:
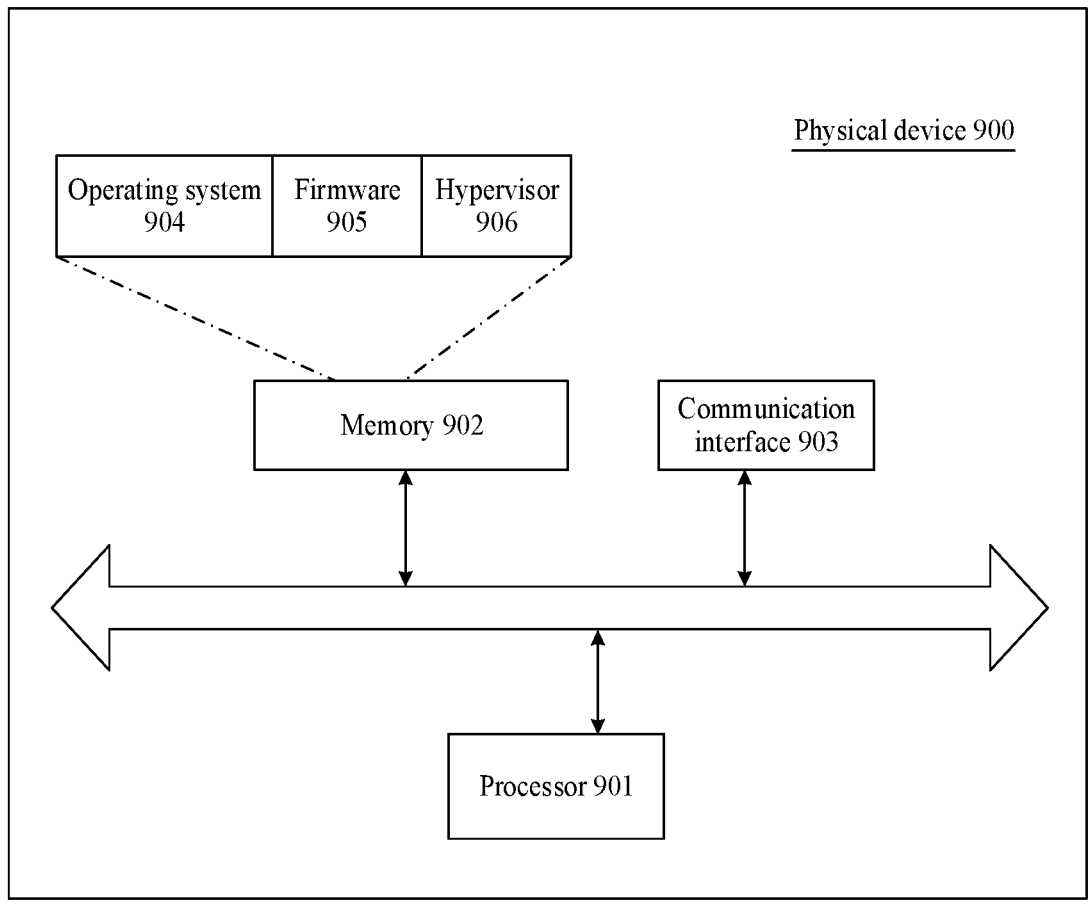
FIG. 9 is a schematic diagram of a structure of a quick start apparatus according to an embodiment of this application.

FIG. 9 is a schematic diagram of a structure of a physical device 900 that can implement the quick start method provided in this application. The physical device 900 may be the BBU or the AAU in the communication system 100, or the physical device shown in FIG. 2a, FIG. 2b, FIG. 3a, FIG. 3b, FIG. 4, and FIG. 5. The physical device 900 includes a processor 901, a memory 902, and a communication interface 903.

The processor 901 is a control center of the physical device 900, and is connected to components of the physical device 900 through various interfaces and buses. In some embodiments, the processor 901 may include one or more processing units, or may be referred to as physical cores, for example, the primary core, the secondary core, the user core, and the control core in the foregoing embodiments. The processor 901 may be a central processing unit (CPU), or the processor 901 may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor 901 may be any conventional processor or the like.

The memory 902 stores a computer program. The processor 901 is configured to execute the computer program in the memory 902, to implement a function defined by the computer program. The memory 902 is a non-volatile storage medium, and generally includes an internal memory and an external memory. The internal memory includes a random access memory (RAM), a read-only memory (ROM), a cache, or the like. The external memory includes but is not limited to a flash memory, a hard disk, a compact disc, a universal serial bus (USB) flash drive, and the like. The computer program is usually stored in the external memory. Before executing the computer program, the processor loads the program from the external memory to the internal memory. The memory 902 may be independent, and is connected to the processor 901 through a bus. Alternatively, the memory 902 and the processor 901 may be integrated into one chip subsystem.

The memory 902 stores an operating system 904, firmware 905, and another program module, and may further store a hypervisor 906. A computer program of the firmware (for example, a BIOS) in this application may be stored in a ROM or a flash memory, or a part of the computer program may be stored in a ROM and the other part of the computer program may be stored in a flash memory. The operating system 904 may be an operating system of the physical device 900, for example, a host machine operating system shown in FIG. 2b and FIG. 3b, or may be an operating system of a virtual machine running on the physical device 900, for example, the guest OS shown in FIG. 2a and FIG. 3a. For the system architecture of a type 1, the hypervisor 906 and the operating system 904 are different software modules. For the system architecture of a type 2, the hypervisor 906 may be a software module in the operating system 904.

The communication interface 903 uses a transceiver apparatus, for example, a transceiver, to implement communication between the physical device 900 and another device or a communication network.

Figure 10:
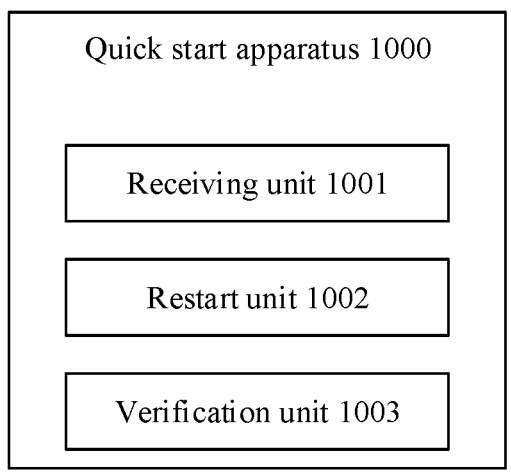
FIG. 10 is a schematic diagram of a structure of a quick start apparatus according to an embodiment of this application.

FIG. 10 is a schematic diagram of a quick start apparatus according to this application. The apparatus includes a receiving unit 1001 and a restart unit 1002. The receiving unit 1001 is configured to: send a restart request to firmware when a software fault occurs, where the restart request indicates the firmware to restart system software. In response to the restart request, the restart unit 1002 is configured to load an image of the system software to restart the system software.

In an embodiment, the restart request indicates the firmware to restart the system software without resetting a hardware device.

In an embodiment, the restart request includes a storage address of the image, and the restart unit is configured to obtain the image based on the storage address of the image.

In an embodiment, the apparatus includes a verification unit 1003, and the verification unit 1003 is configured to: authenticate a verification file of the image based on the image and a signature file of the image; and parse the verification file, and verify the image based on the verification file.

In an embodiment, the system software includes at least one of the following: a hypervisor, the firmware, a trusted execution environment, a host operating system, or an operating system of a virtual machine.

In an embodiment, the restart unit 1002 is further configured to receive the restart request through an application programming interface, where the application programming interface is a customized interface that complies with an interface specification.

Figure 11:
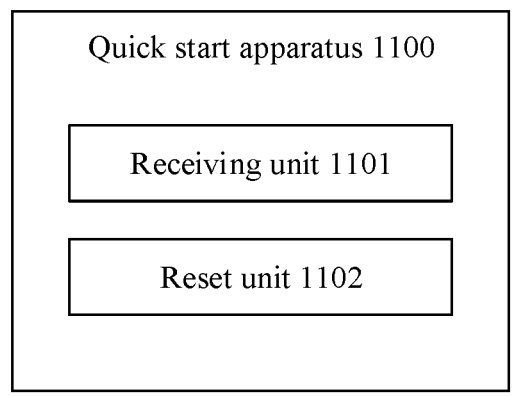
FIG. 11 is a schematic diagram of a structure of a quick start apparatus according to an embodiment of this application.

FIG. 11 is a schematic diagram of a quick start apparatus according to this application. The apparatus includes a receiving unit 1101 and a reset unit 1102. When a hardware fault occurs, the receiving unit 1101 is configured to receive a suspend request, where the suspend request indicates to reset a hardware device. The reset unit 1102 is configured to: store a snapshot of the hardware device; and restore a status of the hardware device based on the snapshot of the hardware device after the hardware device is reset. In some embodiments, the snapshot of the hardware device includes status information of the hardware device, and the status information of the hardware device is stored in a register.

The terms "include", "have", and any other variant thereof in the specification, claims, and the accompanying drawings of this application, are intended to cover a non-exclusive inclusion. For example, a process, a method, a system, a product, or a device that includes a series of operations or units is not limited to the listed operations or units, but, in some embodiments, further includes an unlisted operation or unit, or, in some embodiments, further includes another inherent operation or unit of the process, the method, the product, or the device. An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

What is claimed is:

1. A quick start method, wherein the method comprises:
   receiving, by firmware, a restart request through an application programming interface in response to a software fault, wherein the application programming interface comprises a customized interface that complies with an interface specification, wherein the restart request indicates the firmware to restart system software; and
   in response to the restart request, loading, by the firmware, an image of the system software to restart the system software.

2. The method according to claim 1, wherein the restart request further indicates the firmware to restart the system software without resetting a hardware device.

3. The method according to claim 1, wherein the restart request comprises a storage address of the image, and
   wherein the loading, by the firmware, the image of the system software comprises:
      obtaining, by the firmware, the image based on the storage address of the image.

4. The method according to claim 1, wherein before the loading, by the firmware, the image of the system software to restart the system software, the method further comprises:
   authenticating, by the firmware, a verification file of the image based on the image and a signature file of the image; and
   parsing, by the firmware, the verification file, and verifying the image based on the verification file.

5. The method according to claim 1, wherein the system software comprises at least one of the following: a hypervisor, the firmware, a trusted execution environment, a host operating system, or an operating system of a virtual machine.

6. A quick start apparatus, wherein the apparatus comprises a processor and a memory, the memory stores computer instructions, and when the computer instructions are called by the processor, the apparatus performs operations comprising:
   receiving a restart request through an application programming interface in response to a software fault, wherein the application programming interface comprises a customized interface that complies with an interface specification, wherein the restart request indicates the processor to restart system software; and
   in response to the restart request, loading an image of the system software to restart the system software.

7. The quick start apparatus according to claim 6, wherein the restart request further indicates the processor to restart the system software without resetting a hardware device.

8. The quick start apparatus according to claim 6, wherein the restart request comprises a storage address of the image, and
   wherein loading the image of the system software to restart the system software comprises:
      obtaining the image based on the storage address of the image.

9. The quick start apparatus according to claim 6, wherein before the loading the image of the system software to restart the system software, the operations further comprise:
   authenticating a verification file of the image based on the image and a signature file of the image; and
   parsing the verification file, and verifying the image based on the verification file.

10. The quick start apparatus according to claim 6, wherein the system software comprises at least one of the following: a hypervisor, firmware, a trusted execution environment, a host operating system, or an operating system of a virtual machine.

11. A non-transitory machine-readable storage medium having instructions stored therein, which when executed by a processor, cause the processor to perform operations comprising:
   receiving a restart request through an application programming interface in response to a software fault, wherein the application programming interface comprises a customized interface that complies with an interface specification, wherein the restart request indicates the processor to restart system software; and
   in response to the restart request, loading an image of the system software to restart the system software.

12. The non-transitory machine-readable storage medium according to claim 11, wherein the restart request further indicates the processor to restart the system software without resetting a hardware device.

13. The non-transitory machine-readable storage medium according to claim 11, wherein the restart request comprises a storage address of the image, and
   wherein loading the image of the system software to restart the system software comprises:

obtaining the image based on the storage address of the image.

14. The non-transitory machine-readable storage medium according to claim 11, wherein before the loading the image of the system software to restart the system software, the operations further comprise:
   authenticating a verification file of the image based on the image and a signature file of the image; and
   parsing the verification file, and verifying the image based on the verification file.

15. The non-transitory machine-readable storage medium according to claim 11, wherein the system software comprises at least one of the following: a hypervisor, firmware, a trusted execution environment, a host operating system, or an operating system of a virtual machine.

16. The non-transitory machine-readable storage medium according to claim 11, wherein the receiving the restart request comprises: receiving the restart request through an application programming interface, wherein the application programming interface comprises a customized interface that complies with an interface specification.

* * * * *